W. H. CUMMINGS.
Seeding Attachments for Cultivators.
No. 147,908.             Patented Feb. 24, 1874.
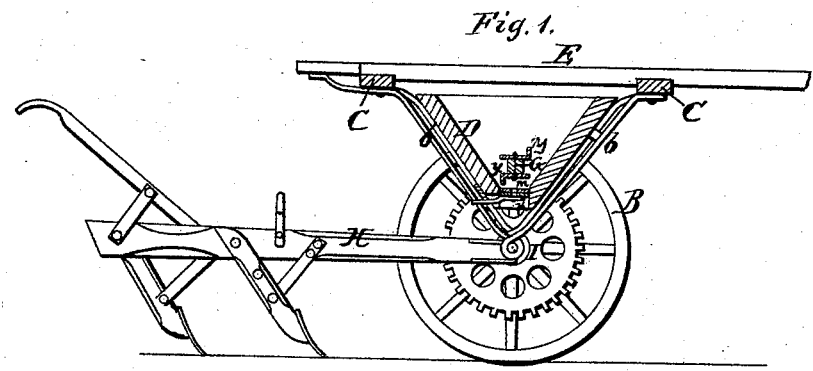
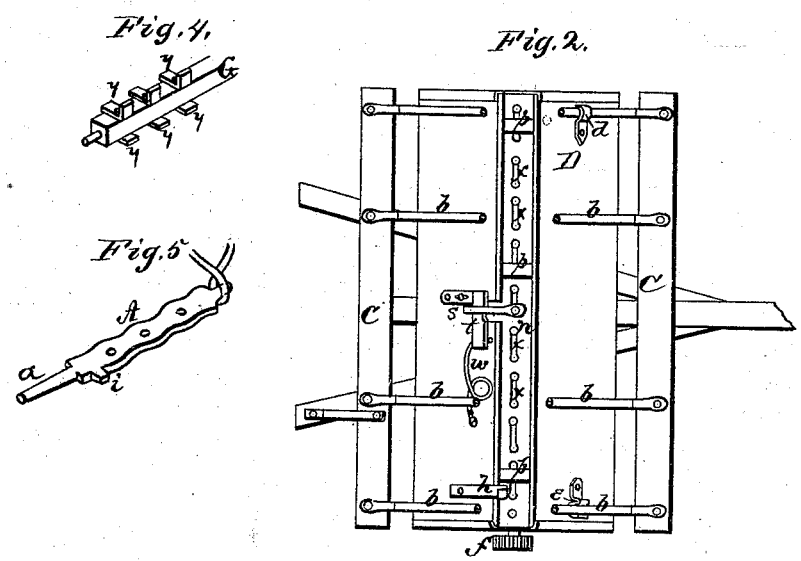
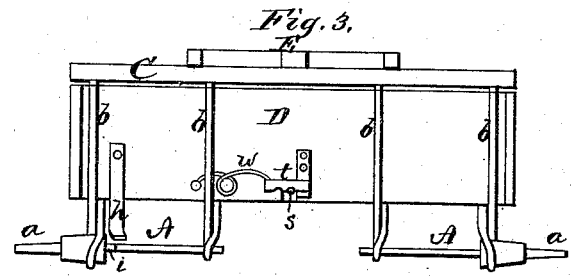
WITNESSES             INVENTOR

UNITED STATES PATENT OFFICE.

WILLIAM H. CUMMINGS, OF BOONESBOROUGH, IOWA.

IMPROVEMENT IN SEEDING ATTACHMENTS FOR CULTIVATORS.

Specification forming part of Letters Patent No. 147,908, dated February 24, 1874; application filed September 8, 1873.

*To all whom it may concern:*

Be it known that I, WILLIAM H. CUMMINGS, of Boonesborough, in the county of Boone and in the State of Iowa, have invented certain new and useful Improvements in Seeding Attachment for Cultivators; and do hereby declare that the following is a full, clear, and exact description thereof, reference being had to the accompanying drawings and to the letters of reference marked thereon, making a part of this specification.

The nature of my invention consists in the construction and arrangement of a seeding attachment for cultivators, as will be hereinafter more fully set forth.

In order to enable others skilled in the art to which my invention appertains to make and use the same, I will now proceed to describe its construction and operation, referring to the annexed drawing, in which—

Figure 1 is a transverse vertical section, Fig. 2 a bottom view, and Fig. 3 a rear elevation, of my seeding attachment. Fig. 4 is a perspective view of a part of the seed-agitator, and Fig. 5 shows one of the axles.

A A represent short flat axles, having each, upon its outer end, a spindle, *a*, upon which the wheels B B are placed, the said axles being supported by and in twisted rods *b b*. These rods, or, rather, their ends, extend upward in opposite directions, and are attached to bars C C, and to these bars the tongue E is secured. This forms the frame of my machine, a cultivator-beam, H, being adjustably attached to each axle A in any of the known and usual ways. D represents the seed-box, made in suitable shape to fit between the rods *b b* below the tongue E and bars C C. In the ends of this box the agitator-bar G has its bearings. The box D is held at one end, by means of a clip, *d*, from rising or moving endwise, and at the other end it is held by an iron, *e*, from moving endwise; but, at this end, the box is allowed to move up and down, so as to be thrown in and out of gear. The driving-wheels B B are made low, so as to bring the bottom of the seed-hopper as close as possible to the ground, and lessen the liability of the grain being scattered by the wind. The tongue E is, therefore, located above the hopper, so as to bring the draft in proper position for the low wheels and low seeding-hopper. On the inner side of the driving-wheel, at this end of the machine, is secured a cog-wheel, I, which gears with a pinion, *f*, on the journal of the agitator-bar G, whereby said bar is revolved when the machine is in motion. On the rear side of the box D, at this end of the machine, is a hooked arm, *h*, which is operated upon by a lug or projection, *i*, on the axle to raise the box and throw the seeding apparatus out of gear. This is done by raising the cultivator-beam to hook it up in turning and in going to and from the field. *m* represents the bottom of the seed-box, which is made perforated, as shown; and beneath the same is a slide, *n*, which is also perforated with corresponding holes to let the seed through. This slide is slotted between the holes, as shown at *x x* in Fig. 2, to let the dust work out from between the slide *n* and the bottom *m*, thus preventing the packing of the dust between them, which will sometimes prevent the slide from working freely. The bottom *m* is held in place by sliding into grooves in the sides of the box; and the slide *n* is held to place by iron straps *p p* across the bottom, and screwed to the wood at either side. The slide *n* is provided with a handle, *s*, which is held in a notched bar, *t*, one notch for the slide open and the other for it closed. *w* is a spring for holding the bar *t* down to the handle *s*. The agitator-bar G is, on opposite sides, provided with L-shaped scrapers *y y*, which keep the holes from clogging with straw, and also press the seed through the holes, scattering the seed more evenly.

Having thus fully described my invention, what I claim as new, and desire to secure by Letters Patent, is—

The combination, of the axle A, having lug *i*, wheel B, having gear-wheel I, movable seed-box D, having hook *h*, with the pinion-wheel *f* and the beam H, secured to the axle, substantially as and for the purposes herein set forth.

WILLIAM H. CUMMINGS.

Witnesses:
A. J. DYER,
C. C. HENSHAW.